(12) United States Patent
Saito et al.

(10) Patent No.: US 7,159,390 B2
(45) Date of Patent: Jan. 9, 2007

(54) EXHAUST GAS CLEANER FOR INTERNAL COMBUSTION ENGINE WITH PARTICULATE FILTER HAVING HEAT-ABSORBING AREA

(75) Inventors: Makoto Saito, Okazaki (JP); Shigeto Yahata, Oobu (JP); Kazuharu Tochikawa, Kariya (JP); Kojiro Tokuda, Toki (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 10/867,209

(22) Filed: Jun. 15, 2004

(65) Prior Publication Data

US 2005/0011186 A1 Jan. 20, 2005

(30) Foreign Application Priority Data

Jun. 16, 2003 (JP) .............................. 2003-170492

(51) Int. Cl.
*F01N 3/00* (2006.01)

(52) U.S. Cl. .......................................... 60/297; 60/311

(58) Field of Classification Search ................. 60/297, 60/311; 55/DIG. 30, 282, 284, 523, DIG. 10
See application file for complete search history.

(56) References Cited

U.S. PATENT DOCUMENTS

| | | | | |
|---|---|---|---|---|
| 4,293,357 A | * | 10/1981 | Higuchi et al. | ........... 156/89.22 |
| 4,417,908 A | * | 11/1983 | Pitcher, Jr. | ..................... 55/523 |
| 4,509,966 A | * | 4/1985 | Dimick et al. | ................. 55/502 |
| 4,667,469 A | | 5/1987 | Abthoff et al. | |
| 4,857,089 A | * | 8/1989 | Kitagawa et al. | ............. 55/523 |
| 5,098,455 A | * | 3/1992 | Doty et al. | .................... 55/523 |
| 5,519,993 A | * | 5/1996 | Rao et al. | ...................... 60/288 |
| 5,549,725 A | * | 8/1996 | Kasai et al. | ................... 55/523 |
| 5,720,787 A | | 2/1998 | Kasai et al. | |
| 6,508,852 B1 | * | 1/2003 | Thompson et al. | ........... 55/523 |
| 6,655,133 B1 | * | 12/2003 | Mikami et al. | ............... 60/296 |

FOREIGN PATENT DOCUMENTS

| | | |
|---|---|---|
| EP | 0 277 012 | 8/1988 |
| EP | 1 312 776 | 5/2003 |
| JP | 61-138812 | 6/1986 |
| JP | 02-112919 | 9/1990 |
| JP | 5-133217 | 5/1993 |
| JP | 8-281034 | 10/1996 |

OTHER PUBLICATIONS

French Search Report dated Oct. 14, 2005.

* cited by examiner

*Primary Examiner*—Thomas Denion
*Assistant Examiner*—Diem Tran
(74) *Attorney, Agent, or Firm*—Nixon & Vanderhye PC

(57) ABSTRACT

To prevent the deterioration of catalyst or the damage of a particulate filter caused by the rapid temperature rise of the particulate filter when the abrupt deceleration of an engine occurs, and avoid the deterioration of fuel consumption by depositing a large PM in the particulate filter and regenerating the same at once.

A heat-absorbing area 4 is provided by forming a deeply clogged structure at the exhaust gas flowing-out side end of the particular filter 1 disposed in an exhaust pipe 2 of an internal combustion engine E. As the heat-absorbing area has a heat capacity larger than that in the other portions, the combustion heat is absorbed and dispersed even if the rapid chain reaction of PM combustion occurs, whereby it is possible to suppress the temperature rise of the downstream portion of the particulate filter liable to be high in temperature.

7 Claims, 11 Drawing Sheets

PARTIALLY DEEPLY CLOGGED

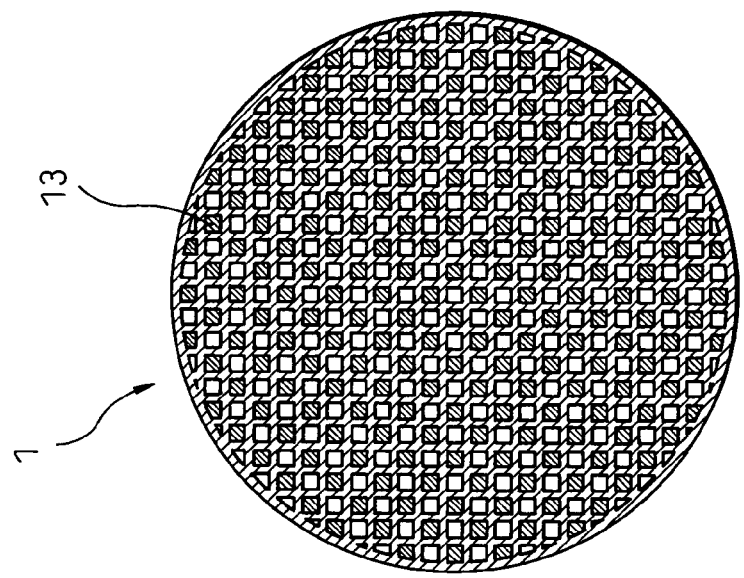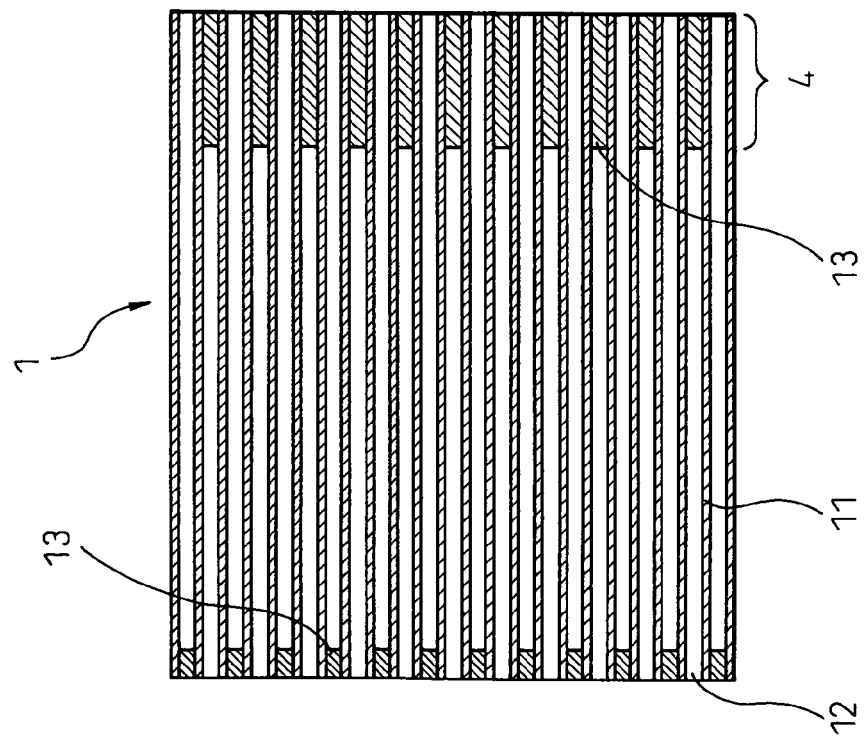

COMPLETELY DEEPLY CLOGGED

PARTIALLY DEEPLY CLOGGED

DEEPLY CLOGGED EXCEPT
FOR THE OUTER CIRCUMFERENCE

EMBODIMENT IN WHICH THE DOWNSTREAM CELLULAR WALL IS THICKENED

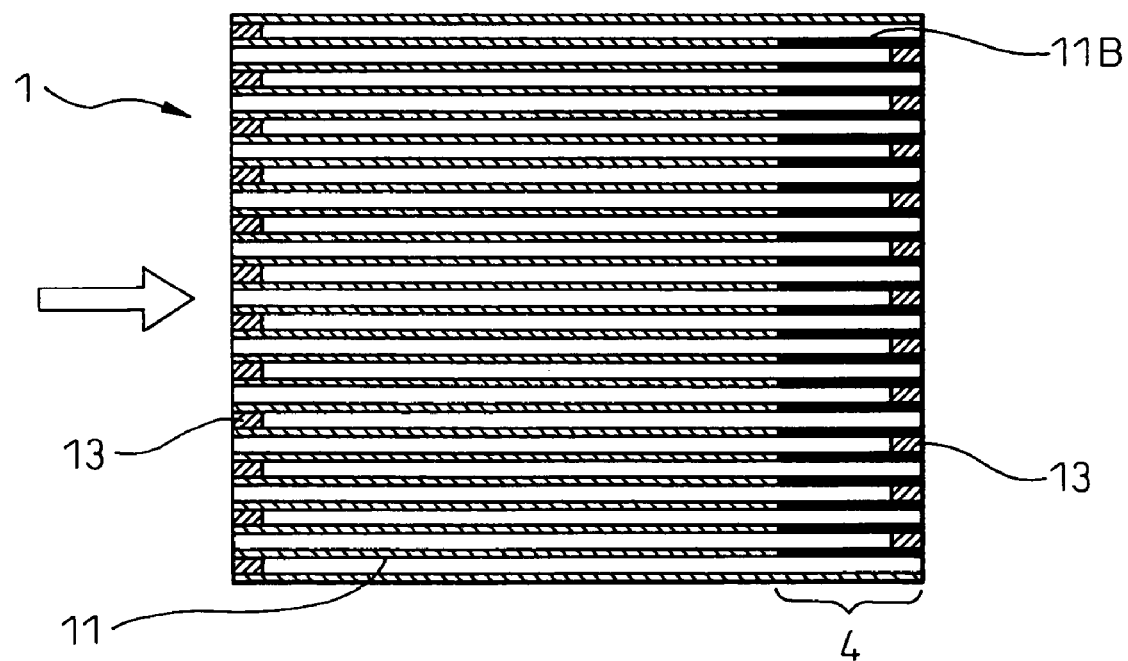

EMBODIMENT IN WHICH HEAT CAPACITY MATERIAL IS COATED ON THE DOWNSTREAM SIDE

EMBODIMENT IN WHICH DOWNSTREAM CATALYST-COATED LAYER IS THICKENED

PRESENT INVENTION

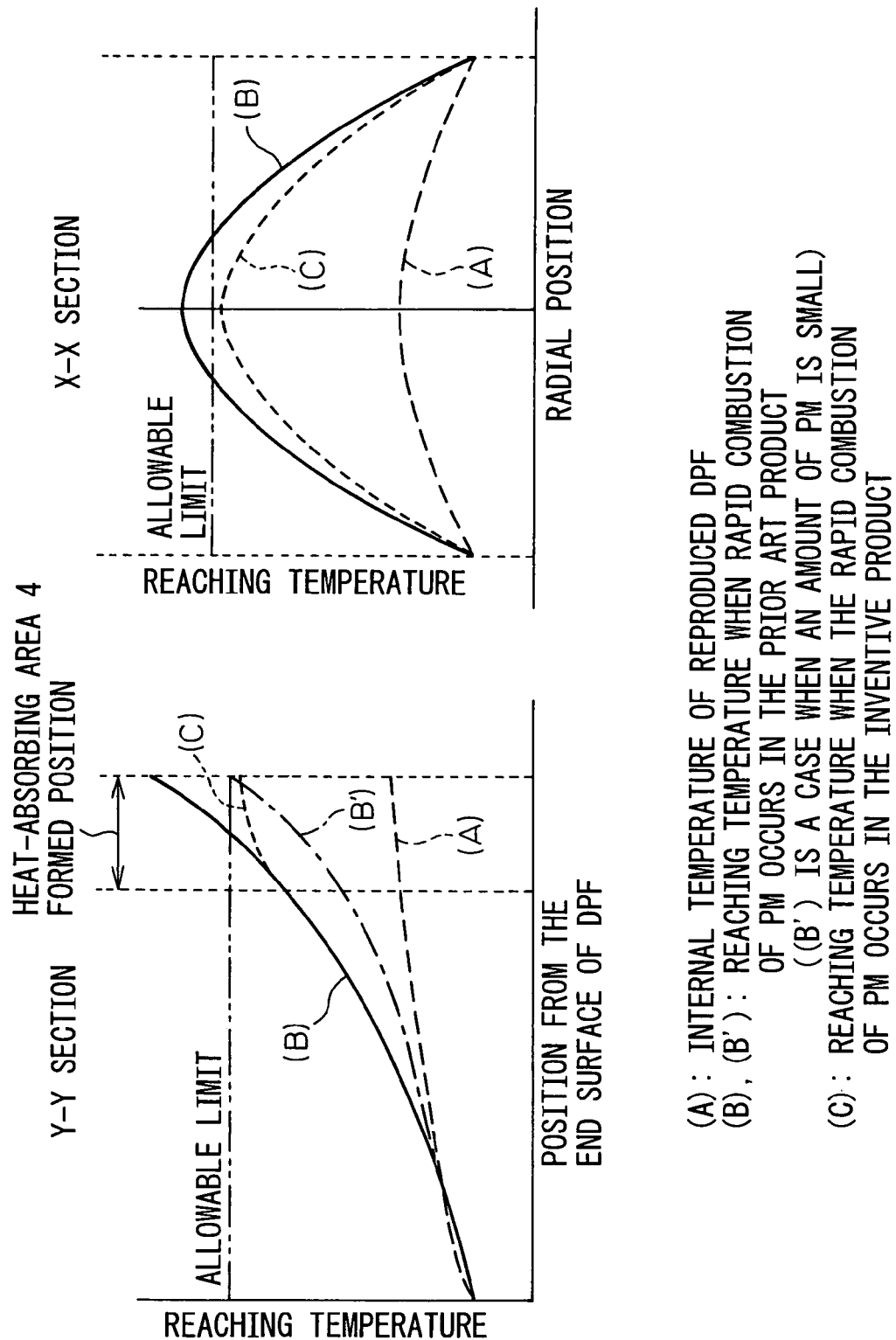

EXHAUST GAS CLEANER FOR INTERNAL COMBUSTION ENGINE WITH PARTICULATE FILTER HAVING HEAT-ABSORBING AREA

BACKGROUND OF THE INVENTION

1. Field of the Invention

The present invention relates to an exhaust gas cleaner provided with a particulate filter for collecting particulates contained in exhaust gas of an internal combustion engine and, more specifically, to a particulate filter structure capable of restricting the quick combustion of particles when the particulate filter is regenerated.

2. Description of the Related Art

Various devices have been proposed as environmental countermeasures for reducing the amount of particulates (particle material; hereinafter referred to as PM) exhausted from a diesel engine. Typically, a system has been known in which a particulate filter, such as one coated with catalyst on its surface, is provided in an exhaust pipe to collect PM. A particulate filter has a number of cells as gas passages and is adapted to adsorb and collect PM when exhaust gas passes through porous partition walls separating many such cells from each other. An oxidation catalyst may be coated on the surface of the particulate filter. As the pressure loss of the particulate filter increases when an amount of deposited PM increases, to result in an inconvenience such as the lowering of engine output, the regeneration treatment for burning and removing the collected PM is intermittently carried out so that the particulate filter is continuously usable.

A main method for regenerating a particulate filter is such that, for the purpose of burning PM, the temperature of the particulate filter is increased by controlling the exhaust gas flowing into the particulate filter to be a high temperature gas or by generating heat in the exhaust gas containing much green (unburnt) fuel by a catalytic reaction. Also, it is effective that a large amount of PM is deposited in the particulate filter and removed at once in view of minimizing the deterioration of fuel consumption due to the regeneration treatment.

However, if PM is excessively deposited, there is a problem in that PM quickly burns in a chain reaction during the regeneration treatment or when the engine is abruptly decelerated in high speed driving. That is, as the exhaust gas entering from the upstream side end of the particulate filter flows to the downstream side end thereof while gradually absorbing the combustion heat of PM when PM deposited on the particulate filter burns, the temperature in the interior of the particulate filter is usually higher toward the downstream. At this time, when the flow rate of the exhaust gas is suddenly lowered, for example, due to the abrupt deceleration, it is not possible to absorb the combustion heat of PM. Accordingly, the temperature of the downstream part of the particulate filter in a hot state rises further to cause the self-combustion of PM, resulting in a rapid chain reaction.

The rapid combustion of PM described above causes the deterioration of catalyst and, in an extreme case, the thermal destruction (cracking or melting) of a matrix of the particulate filter results. In this regard, for example, Japanese Unexamined Patent Publication (Kokai) No. 61-138812 discloses a countermeasure in which the thermal destruction of the particulate filter is avoided by shifting passage-closure positions of respective cells at the downstream end of the filter in the gas-flowing direction. Also, Japanese Unexamined Patent Publication (Kokai) Nos. 8-281034 and 05-133217 discloses another countermeasure in which the resistance to heat shock is improved by causing a thickness of a closure at each of opposite ends of the filter to be uneven or to be thicker toward the outer circumference.

The countermeasures described in these patent documents, however, are to shift the positions at which PM is deposited, so that portions which may be hot due to the combustion or portions at which the concentration of stress or combustion heat concentration may occur due to heat shock are widely distributed to avoid the generation of cracking or melting. That is, according to these countermeasures, as the temperature rise of the particulate filter itself is not prevented, the risk of damage caused by the high temperature is not eliminated when the rapid chain reaction of PM combustion occurs due to the operation condition. Also, there is another problem in that, when the particulate filter is coated with a catalyst, a catalyst may be deteriorated.

In the prior art, to prevent the particulate filter from damage, an allowable limit amount of PM to be deposited is set at a low level and the particulate filter is frequently regenerated, which causes a serious problem in that the fuel consumption is deteriorated. Thus, it has been desired to develop a technique capable of depositing a large amount of PM so that the deterioration of fuel consumption due to the regeneration of the particulate filter is avoidable.

Accordingly, an object of the present invention is to provide an exhaust gas cleaner capable of suppressing the temperature rise in the particulate filter even if the rapid chain reaction of PM combustion occurs due to the abrupt deceleration of an engine to avoid the deterioration of catalyst and the damage of the particulate filter, and capable of depositing a large amount of PM in the particulate filter and regenerating the same at once to prevent the fuel consumption of the engine from deteriorating.

SUMMARY OF THE INVENTION

To solve the above-mentioned problems, an exhaust gas cleaner for an internal combustion engine according to a first aspect of the present invention includes a particulate filter provided midway in an exhaust pipe of the internal combustion engine, for collecting particles in exhaust gas; and a particulate-filter regenerating means for regenerating the particulate filter by burning and removing collected particles at a suitable time. A heat-absorbing area having a heat capacity larger than that of the other portions is provided on an end of an exhaust gas flowing-out side of the particulate filter to absorb and dissipate combustion heat, generated from the particle combustion, at the heat-absorbing area.

According to the above structure, as the combustion heat is absorbed and dissipated by the heat-absorbing area even if the rapid chain reaction of PM combustion occurs due to the abrupt deceleration of the engine or others, the temperature rise of the particulate filter, particularly at the exhaust gas flowing-out side end liable to be high temperature can be suppressed to lower the maximum temperature thereof. Thereby, since it is possible to deposit a larger amount of PM in the particulate filter while preventing the catalyst carried on the particulate filter from being deteriorated and the filter matrix from being damaged, the safety and the economic superiority are improved without deteriorating the fuel consumption caused by the frequent regeneration thereof.

According to a second embodiment of the inventive exhaust gas cleaner, the heat-absorbing area is formed, based on the temperature distribution of the particulate filter during the regeneration thereof, so that the maximum temperature of the particulate filter does not exceed an allowable limit.

Concretely, the heat capacity of the heat-absorbing area is preferably determined so that the maximum temperature of the particulate filter is below a allowable limit by absorbing and dissipating the combustion heat of PM. Thereby, even if PM burns rapidly, the temperature of the particulate filter does not exceed the temperature at which the catalyst is deteriorated or the filter is damaged. Thus, safety is secured.

According to a third embodiment of the present invention, the particulate filter is of a wall flow type, and has a monolithic structure having a number of cells sectioned by porous walls and the cells are alternately clogged at the exhaust gas flowing-in or flowing-out side ends of the cells.

As the above-mentioned particular filter, the wall flow type is preferably used, wherein opposite end surfaces of the monolithic structure are alternately clogged. The water flow type filter collects the particles while the exhaust gas passes through the porous wall between the cells, and has an excellent collecting efficiency, as well as, is easily manufactured.

According to a fourth embodiment of the present invention, the heat-absorbing area is formed by a deeply clogged structure in which a depth of the clogged sections at the exhaust gas flowing-out side end of the monolithic structure is deeper than that of the clogged sections at the exhaust gas flowing-in side end.

Concretely, a depth of the clogged sections on the exhaust gas flowing-out side end surface of the monolithic structure is made to be deeper than that of the clogged sections on the exhaust gas flowing-in side, whereby the heat-absorbing area high in heat capacity can be formed.

According to a fifth embodiment of the present invention, the deeply clogged structure forming the heat-absorbing area is formed by making part of the clogged sections on the exhaust gas flowing-out side longer than the clogged section on the exhaust gas flowing-in side, while the depth of the other of the former clogged sections is equal to that in the exhaust gas flowing-in side.

By providing the deeply clogged structure on part of the exhaust gas flowing-out side, the effect is obtainable, for restricting the increase in gas flow resistance.

According to a sixth embodiment of the present invention, the heat-absorbing area is formed by a deeply clogged structure in which a depth of the clogged sections except at least those in the outer circumference is deeper on the exhaust gas flowing-out side end of the monolithic structure than that on the exhaust gas flowing-in side.

Since the outer circumferential edge of the monolithic structure in contact with the exhaust pipe wall has a relatively low temperature, it is possible to further suppress the increase in gas flow resistance by forming the deeply clogged section in an area except for the outer circumferential edge.

According to a seventh embodiment of the present invention, the deeply clogged structure is deeper in the central portion of the monolithic structure and is shallower in the outer circumference thereof.

By providing deeper clogged sections in the central portion of the monolithic structure liable to increase the temperature thereof and shallower clogged sections in the outer circumference having relatively low temperature, it is possible to effectively suppress the temperature rise and the increase in the gas flow resistance of the particulate filter.

According to a eighth embodiment of the present invention, the heat-absorbing area is formed by thickening the cellular walls of the monolithic structure at the exhaust gas flowing-out side end to more than the other portions of the monolithic structure.

By thickening the cellular walls in the monolithic structure, it is also possible to increase the heat capacity of the cellular walls, and the same effect as above is obtainable by making the thickened cellular walls to make a heat-absorbing area.

According to a ninth embodiment of the present invention, the heat-absorbing area is formed by decreasing the porosity of the cellular walls at the exhaust gas flowing-out side end of the monolithic structure thinner than that of the other portions of the monolithic structure.

By densifying the cellular walls of the monolithic structure, it is also possible to increase the heat capacity of the cellular walls. By making the densified cellular walls to be a heat-absorbing area, the same effect as described above is obtainable. Also, by densifying the cellular walls, the heat conductivity of the cellular walls is enhanced as well as the passage area of the cells is secured.

According to a tenth embodiment of the present invention, the heat-absorbing area is formed by coating a heat-capacitated material on the cellular wall surfaces at the exhaust gas flowing-out side end of the monolithic structure.

By coating the cellular walls with the heat-capacitated material, it is also possible to increase the heat capacity of the cellular walls. The same effect as described above is obtainable by making the coated cellular walls to be a heat-absorbing area.

According to an eleventh embodiment of the present invention, the particulate filter is adapted to have a catalyst-coated layer on the surfaces of the cellular walls, and the heat-absorbing area is formed by thickening the catalyst-coated layer at the exhaust gas flowing-out side end of the monolithic structure to more than the other portions of the monolithic structure.

As the coated member carrying the catalyst is the heat-capacitated material, it is also possible to increase the heat capacity of the cellular walls by thickening the catalyst-coated layer. The same effect as described above is obtainable by making the cellular walls with a catalyst-coated layer to make a heat-absorbing area.

The present invention may be more fully understood from the description of the preferred embodiments of the invention set forth below, together with the accompanying drawings.

BRIEF DESCRIPTION OF THE DRAWINGS

In the drawing;

FIG. 1B is a whole sectional view of a particulate filter of FIG. 1A;

FIG. 1C is an end view of the particulate filter of FIG. 1B;

FIG. 5C is a whole sectional view of a particulate filter according to a seventh embodiment of the present invention;

FIG. 8C are graphs showing the distribution of the temperature in Y—Y cross-sections and X—X cross-sections of the particulate filters, respectively.

DESCRIPTION OF THE PREFERRED EMBODIMENTS

Figure 1A:
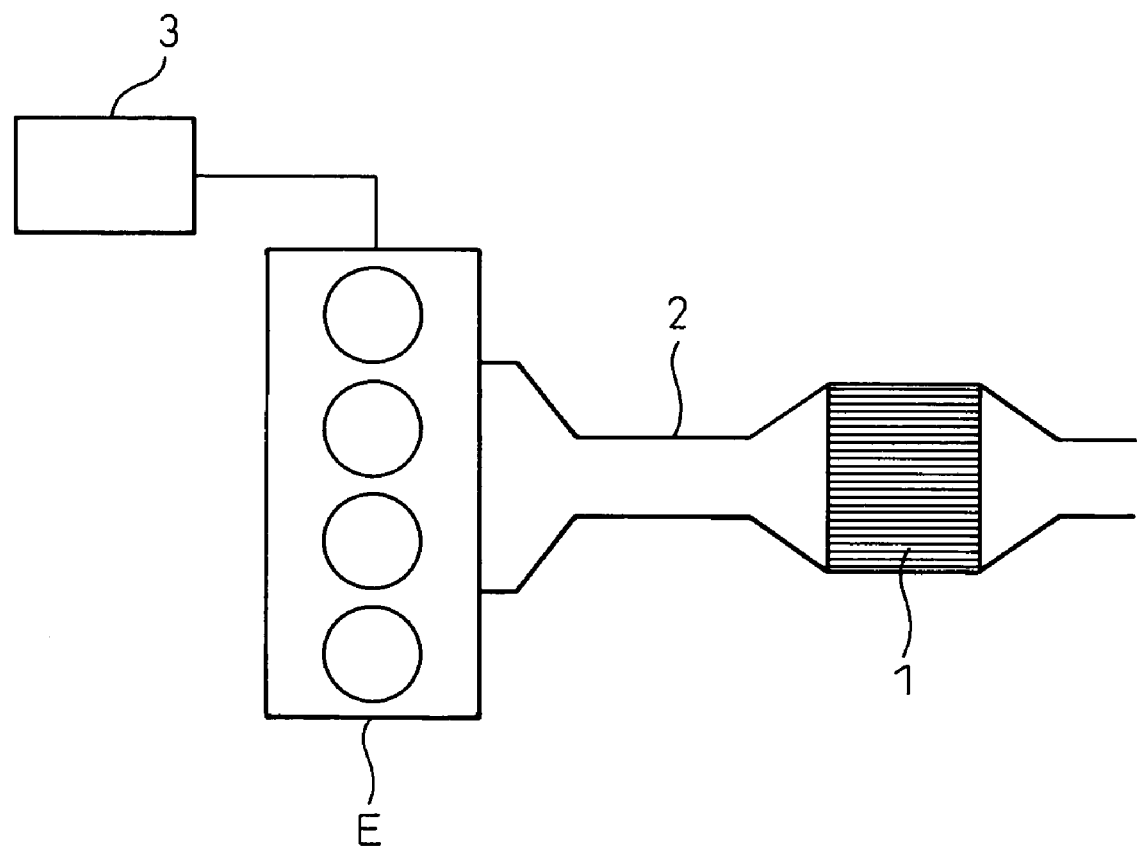
FIG. 1A is a schematic view showing a whole construction of an exhaust gas cleaner in an internal combustion engine according to a first embodiment of the present invention.

A first embodiment of the present invention will be described in detail below with reference to the attached drawings. FIG. 1A is a schematic view showing a whole construction of an exhaust gas cleaner for an internal combustion engine to which the present invention is applied. As illustrated, an exhaust pipe 2 of an internal combustion engine E has a large diameter portion on its way for accommodating a particulate filter 1 therein. The internal combustion engine E is, for example, a diesel engine, and the particulate filter 1 is a diesel particulate filter (DPF) for collecting particulates (PM) exhausted from the diesel engine. The particulate filter 1 is regenerated by burning to remove the collected PM at suitable times by using a particulate filter regenerating means 3.

As shown in FIGS. 1B and 1C, the particulate filter 1 has a columnar monolithic structure internally partitioned by porous cellular walls 11 extended in an axial direction of the filter 1 to have a number of cells 12 arranged parallel to an exhaust gas flow. Each of these many cells 12 of the particulate filter 1 is closed by a plug at either an exhaust gas flowing-in side end or an exhaust gas flowing-out side end thereof (a clogged section 13). In this regard, either ends of cells are clogged at the upstream sides or the downstream sides of the cells, so that the open end of a cell alternates with that of the adjacent cell and, therefore, a wall flow structure is obtained, in which the exhaust gas flows, between the adjacent cells 12, through the cellular walls 11. Preferably, if oxidation catalyst is carried on the inner surface (the surface of the cellular wall 11) of the particulate filter 1, it is possible to lower the combustion temperature of PM to stabilize the combustion. Catalysts for cleaning the exhaust gas may be carried on the particulate filter 1 other than the oxidation catalyst.

A cross-sectional shape of the cell 12 is usually a quadrangle, and while a square is adopted in this embodiment, a rectangle may be adopted. Alternatively, other polygons including a triangle or the like may be adopted. The outer circumferential shape of the particulate filter 1 is not necessarily a complete circle but may be an oval or a polygon. The particulate filter 1 may be formed of heat-resistant ceramic, such as cordierite, and by adjusting a particle size of the used material, an amount of additives burning out in the firing process or the like, it is possible to regulate the porosity and the pore size of the cellular walls 11. Generally speaking, as the porosity and the pore size of the cellular wall 11 becomes larger, the pressure loss becomes less. However, since the PM-collecting ability becomes worse if they are excessively large, they should be suitably determined in accordance with the required performance of the particulate filter. While the clogged section 13 may be formed of the same material as the particulate filter 1, other kinds of ceramic may be used. A thickness of the cellular wall 11, an area of the opening of the respective cell 12, etc. may be suitably determined so that the required PM collecting ability is obtained and the pressure loss is prevented from being extremely increased.

As shown in FIG. 1B, according to the present invention, a heat-absorbing area 4 having a heat capacity larger than that of other portions is provided at the exhaust gas flowing-out side end (a righthand end in the drawing) of the particular filter 1 so that the combustion heat of particles is absorbed and dissipated thereby. Concretely, as illustrated, by providing a deeply clogged structure at the exhaust gas flowing-out side end in which a depth of the clogged section 13 is deeper than that of the clogged section 13 at the exhaust gas flowing-in side end, it is possible to define the heat-absorbing area 4. As the heat capacity of the heat-absorbing area 4 increases due to the clogged section 13 having a deeply clogged structure, it is possible to absorb and dissipate the combustion heat of PM and suppress the temperature rise of the exhaust gas flowing-out side end which is liable to be a high temperature. According to this embodiment, all of the clogged sections 13 at the exhaust gas flowing-out side end have the deeply clogged structure having a predetermined depth. The depth of the deeply clogged structure which increases the heat capacity of the particulate filter may be determined so that the maximum temperature of the particulate filter 1 when PM rapidly burns does not exceed an allowable limit. The allowable maximum temperature is different in accordance with kinds of material forming the particulate filter 1 or those of catalysts carried thereon.

The particulate filter 1 of the above structure is manufactured, for example, in the following manner. First, additives, such as organic foamer or carbon and usually used in the field, are blended with ceramic raw material and they are kneaded together to prepare clay-like material, which is then extrusion molded. The organic foamer or carbon is burned out during the firing process to leave pores. After the molded product has been calcined, ends of the respective cells 12 are alternately clogged in the ordinary manner and portions to be the heat-absorbing area 4 are deeply clogged more than usual. Thereafter, the product is fired in the atmosphere by raising the temperature to form the particulate filter 1.

The resultant particulate filter 1 may carry a catalytic component, for example, of precious metal thereon to be a particulate filter with catalyst. To carry the catalytic component, a compound of the catalytic component is dissolved in a solvent, such as water or alcohol, to prepare a catalytic solution which is then impregnated in the particulate filter 1. After an excessive amount of the catalytic solution has been removed, the particulate filter 1 is dried and is stoved in the atmosphere to fix the catalytic component thereon.

Figure 2A:
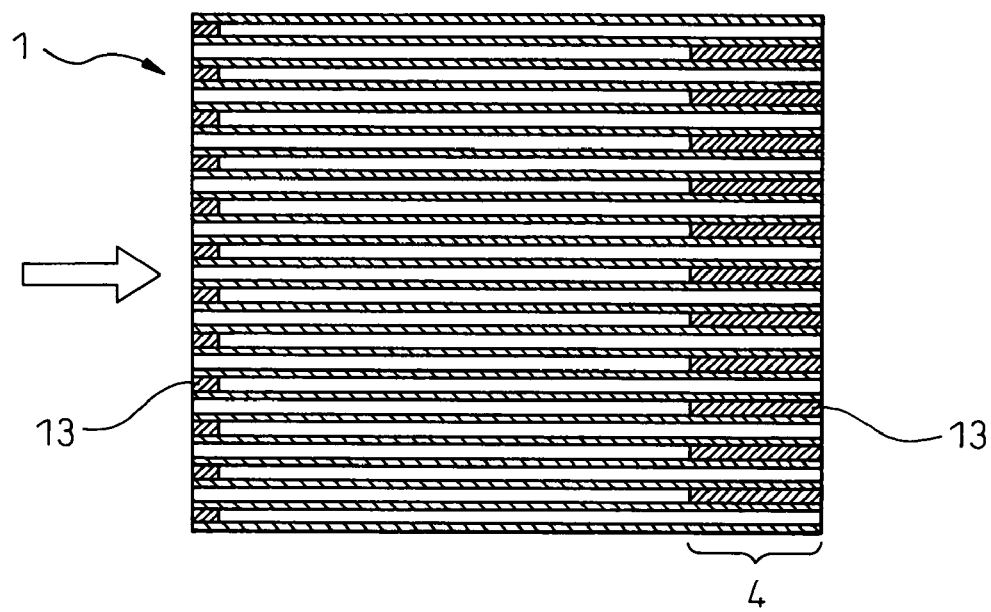
FIG. 2A is a whole sectional view of the particulate filter according to the first embodiment.
Figure 2B:
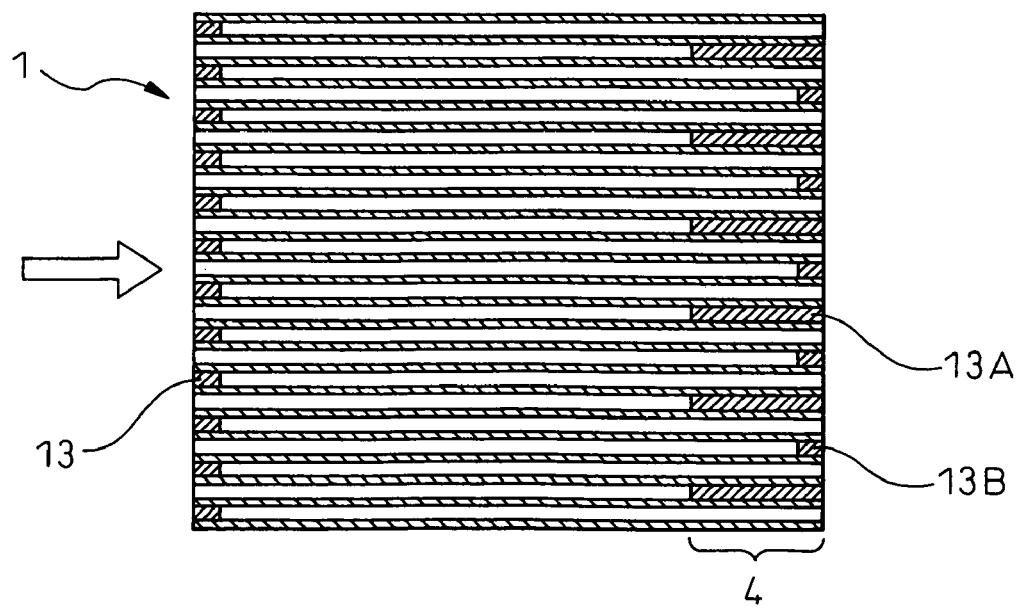
FIG. 2B is a whole sectional view of a particulate filter according to a second embodiment of the present invention.

As shown in FIGS. 2A and 2B, the particulate filter 1 may have a heat-absorbing area 4 formed by a structure in that all the clogged sections 13 provided at the exhaust gas flowing-out side end are deeply clogged (see FIG. 2A) or a structure in that part of the clogged sections 13 provided at the exhaust gas flowing-out side end are solely deeply clogged at a predetermined depth in a second embodiment as shown in FIG. 2B. While the deeply clogged sections 13A and the normally clogged sections 13B are substantially uniformly arranged in the latter case, a ratio or the arrangement thereof may be changed and suitably determined so that the maximum temperature does not exceed the allowable limit based on the temperature distribution in the particulate filter 1 during the regeneration thereof. In such a manner, if all the clogged sections 13 in the heat absorbing area 4 are not deeply clogged but the deeply clogged sections are selectively provided, it is possible to provide an effect for restricting the increase in gas flow resistance.

Figure 3:
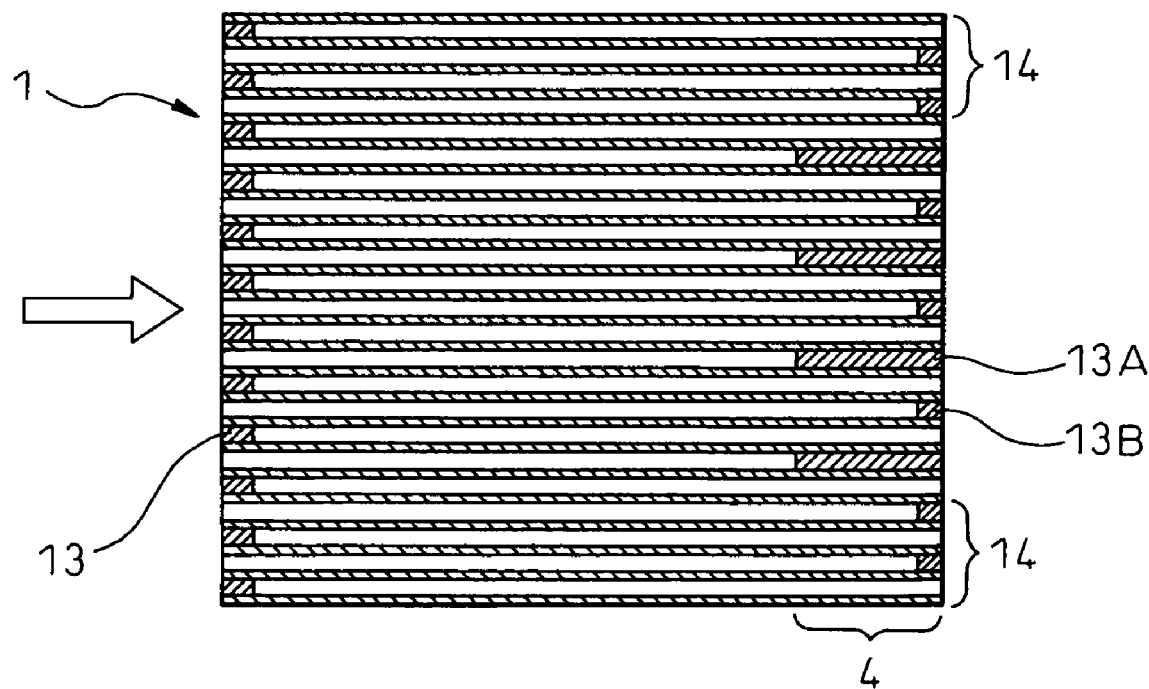
FIG. 3 is a whole sectional view of a particulate filter according to a third embodiment of the present invention.

According to a third embodiment shown in FIG. 3, the deeply clogged section 13A constituting the heat absorbing area 4 is not arranged in an outer circumferential regions 14 of the particulate filter 1, but the deeply clogged sections 13A having a predetermined depth are solely arranged in a central region and the vicinity thereof. In the drawing, while the deeply clogged sections 13A having a predetermined depth and the sections 13B having an normal depth are substantially uniformly arranged in the central region and the vicinity thereof, the deeply clogged structure may be provided in all the central region and the vicinity thereof in the particulate filter 1 except for the outer circumferential regions 14 thereof. As the outer circumferential region 14 dissipates heat more easily than the central region because the former is brought into contact with a wall of the exhaust pipe 2, a risk of exceeding the allowable temperature is less even if it does not rely on the deeply clogged structure. Accordingly, by providing the deeply clogged structure in the particulate filter 1 except for the outer circumferential region 14, it is possible to effectively suppressing the increase in gas flow resistance thereof while restricting the temperature rise.

Figure 4A:
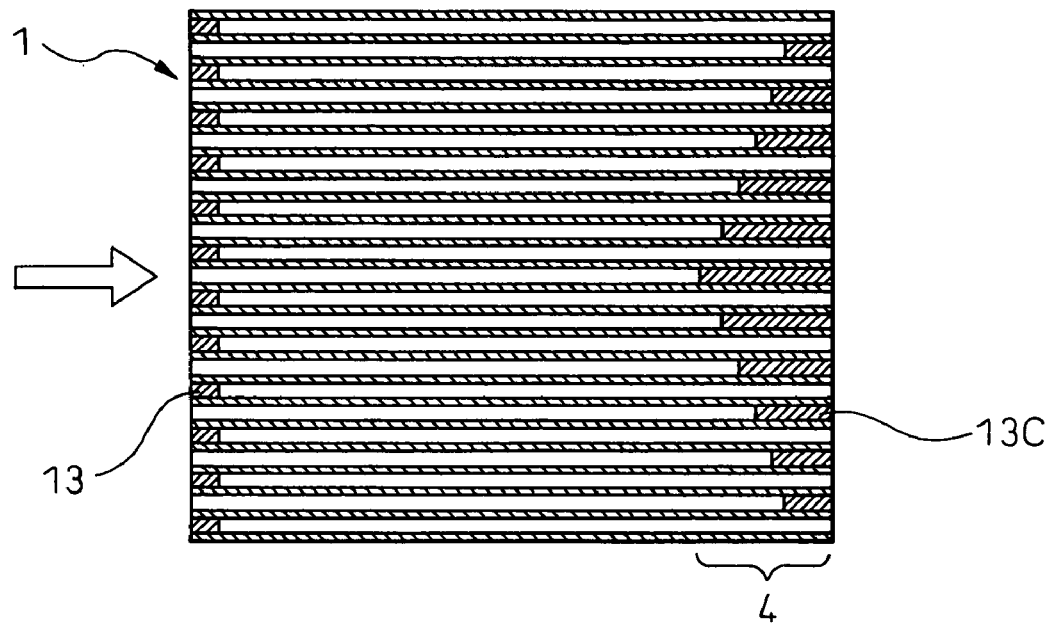
FIG. 4A is a whole sectional view of a particulate filter according to a fourth embodiment of the present invention.
Figure 4B:
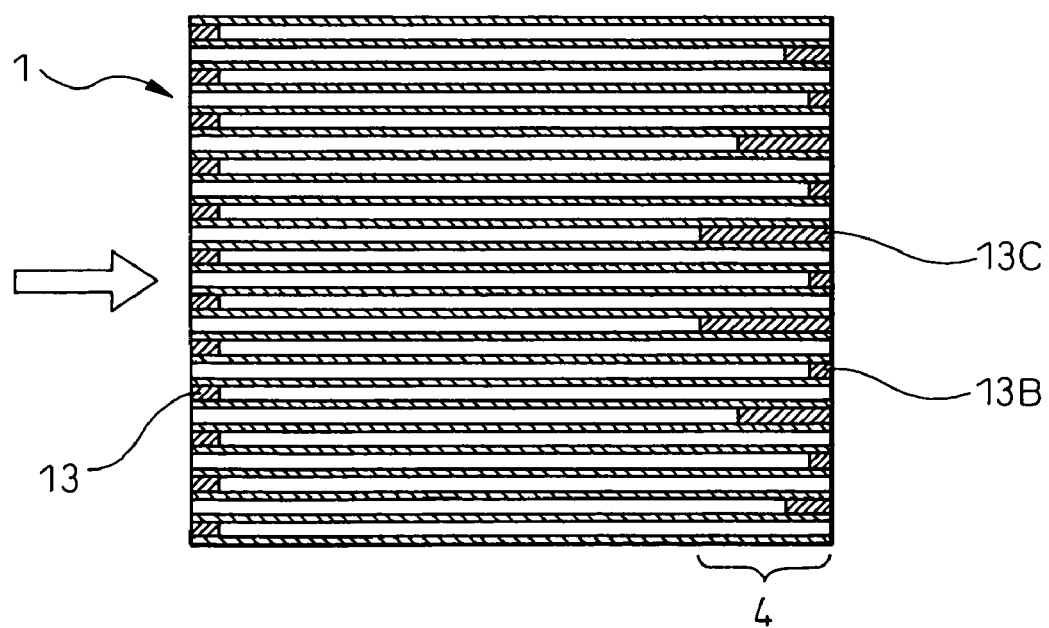
FIG. 4B is a whole sectional view of a particulate filter according to a fifth embodiment of the present invention.

According to a fourth embodiment shown in FIG. 4A, when the heat-absorbing area 4 of the deeply clogged structure is formed at the exhaust gas flowing-out side end, a depth of a deeply clogged section 13C is deeper in the central region and becomes gradually shallower toward the outer circumferential region therefrom. As the temperature distribution of the particulate filter 1 is usually highest in the central region and becomes lower toward the outer circumferential region, it is possible to more effectively absorb and dissipate the combustion heat by constituting the particulate filter so that the heat capacity thereof becomes larger in a high temperature region with correspondence to the temperature distribution. According to a fifth embodiment shown in FIG. 4B, the deeply clogged sections 13C are not provided in the whole of the particulate filter but, instead, the normally clogged sections 13B may be provided in part thereof so that the effect for reducing the gas flow resistance is obtainable.

Figure 5A:
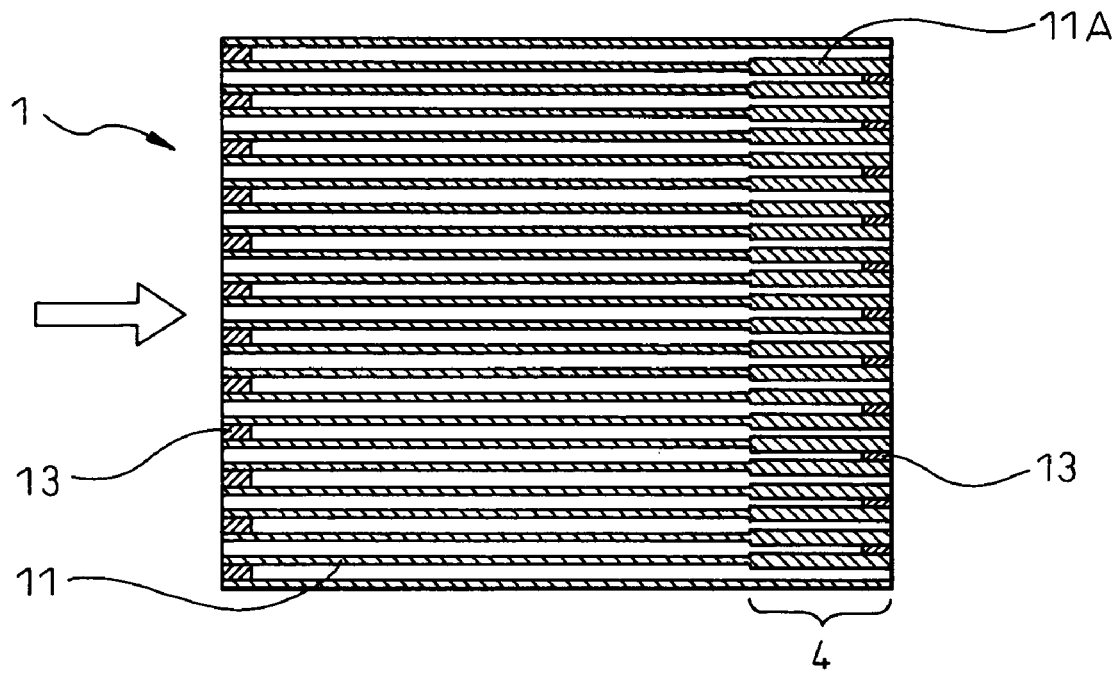
FIG. 5A is a whole sectional view of a particulate filter according to a sixth embodiment of the present invention.
Figure 5B:
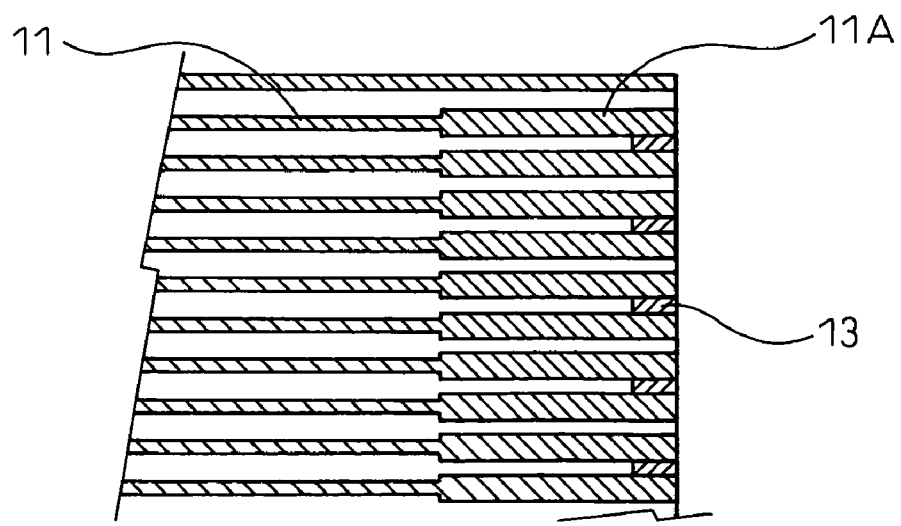
FIG. 5B is an enlarged sectional view of main parts of FIG. 5A.

The heat-absorbing area 4 may be formed by other means than the deeply clogged structure. According to a sixth embodiment shown in FIGS. 5A and 5B, the cellular wall 11 of the particulate filter 1 is formed thicker in a portion over a predetermined length from the downstream end of the cell 12 than in the other portion to define the heat-absorbing area 4. All of the clogged sections 13 have a normal depth. A thickness and a length of the heat-absorbing area 4 may be suitably determined so that the heat capacity necessary for restricting the temperature rise of the particulate filter 1 is obtainable. In this regard, in order to thicken the cellular wall 11, after the matrix ceramic has been monolithically molded and dried, a portion of the particulate filter to be the heat-absorbing area 4 is dipped into a slurry solution containing the matrix ceramic, which then is dried and fired. To obtain the predetermined thickness, the dipping and drying process may be repeated. Also in such a manner, it is possible to form the heat-absorbing area 4 having the large heat capacity on the end of the exhaust gas flow-out side, resulting in the same effect as absorbing and dissipating the combustion heat. Since the cellular wall 11 is porous, the PM collecting volume also is increased without considerably increasing the gas flow resistance.

As in a seventh embodiment shown in FIG. 5C, it is possible to form the heat-absorbing area 4 by reducing the porosity of the cellular wall 11 instead of thickening the cellular wall 11 of the particular filter 1. In the drawing, the cellular wall 11 is densified over a predetermined length from the downstream end of the particulate filter 1 to reduce the porosity in this length to be less than other portions, whereby the heat-absorbing area 4 with increased heat capacity is prepared. All of the clogged sections 13 have a normal depth. The porosity of the cellular wall 11 is usually in a range of approximately 50 to 70%, and that of the heat-absorbing area 4 is preferably smaller than this value. Also in this case, a thickness and a length of the heat-absorbing area 4 is suitably determined so that the heat capacity necessary for suppressing the temperature rise of the particulate filter 1 is obtainable. In this regard, to lower the porosity of the cellular wall 11, after the matrix ceramic has been monolithically molded and dried, a portion to be the heat-absorbing area 4 is impregnated with a ceramic solution capable of entering pores of the matrix ceramic and densifying the same, and is dried and fired. As a result, the heat conductivity of the densified cellular wall 11 is improved, whereby the combustion heat is transmitted through the densified cellular wall 11 and is more easily dissipated out from the outer circumference thereof. Also, as the heat capacity can be increased without thickening the cellular wall 11, it is possible to prevent the gas flow resistance from increasing.

Figure 6A:
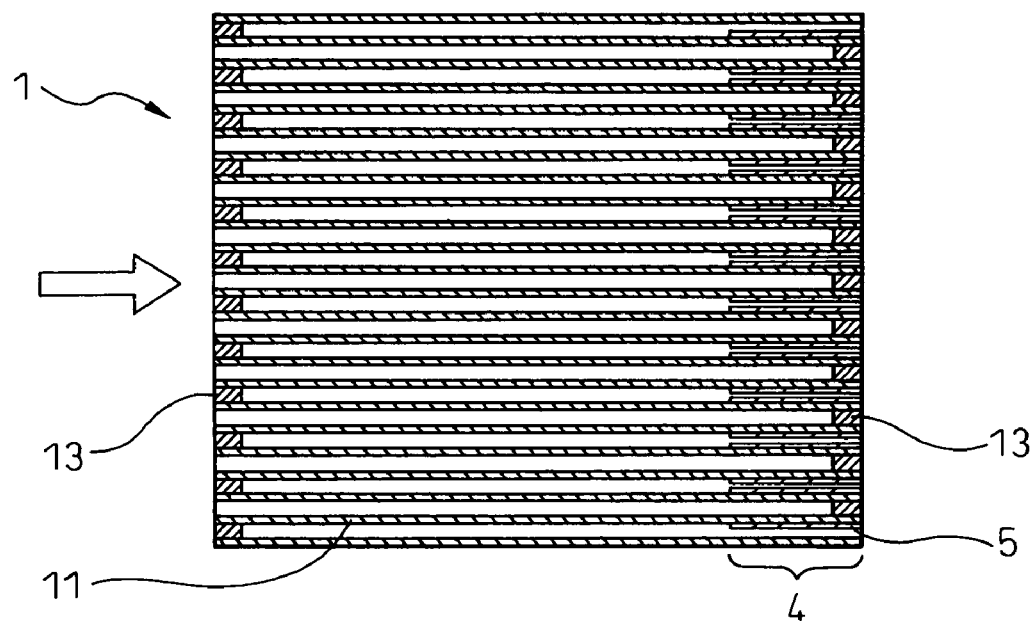
FIG. 6A is a whole sectional view of a particulate filter according to an eighth embodiment of the present invention.
Figure 6B:
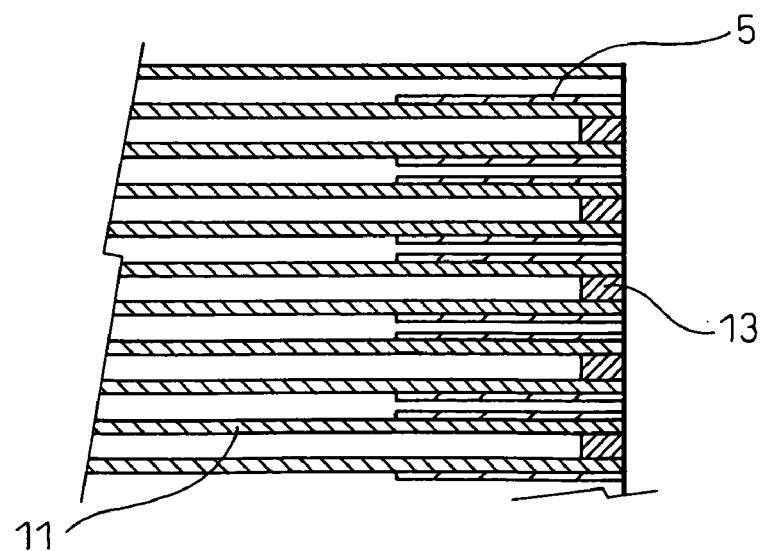
FIG. 6B is an enlarged sectional view of main parts of FIG. 6A.

According to an eighth embodiment shown in FIGS. 6A and 6B, the heat-absorbing area 4 is formed by coating a heat-capacitated material 5 on the exhaust gas flowing-out side end portion of the cellular wall 11 in the particulate filter 1. The heat-capacitated material 5 may be ceramic, such as alumina, silica or talc, different from the matrix ceramic. A method for coating the heat-capacitated material 5 forming the heat-absorbing area 4 is the same as in the abovementioned sixth embodiment; that is, after the matrix ceramic has been monolithically molded and dried, a portion of the cellular wall 11 of a predetermined length from the downstream end thereof is dipped into a slurry solution containing the heat-capacitated material 5, and then is dried and fired. By forming the predetermined length from the downstream end of the cellular wall to be thicker than other portions, the heat-absorbing area 4 is formed. All of the clogged sections 13 have a normal depth. The thickness and length of the heat-absorbing area 4 can be suitably determined so that the heat capacity necessary for restricting the temperature rise of the particulate filter 1 is obtainable. In this regard, to thicken the cellular wall 11, after the monolithically molded matrix ceramic has been dried, a portion to be the heat-absorbing area 4 is dipped in the slurry solution containing the matrix ceramic, and dried and fired. To obtain a predetermined thickness, it may be possible to repeat the dipping and drying process. Since the cellular wall 11 is porous and air-permeable, it is possible to absorb and dissipate the combustion heat while suppressing the increase in gas flow resistance thereof.

Figure 7A:
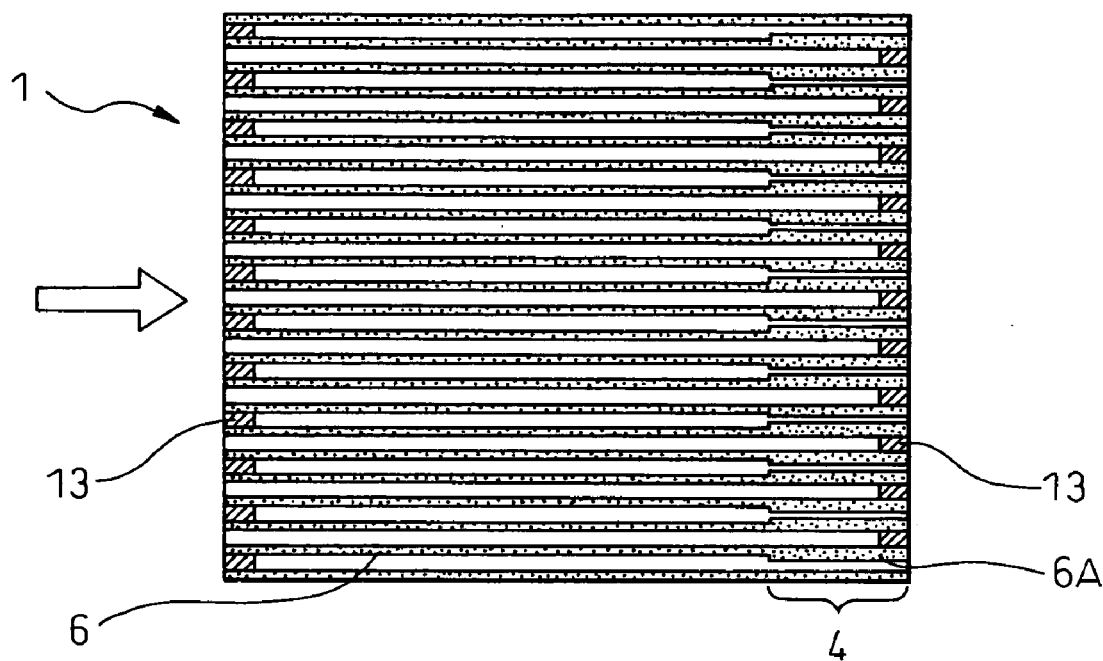
FIG. 7A is a whole sectional view of a particulate filter according to a ninth embodiment of the present invention.
Figure 7B:
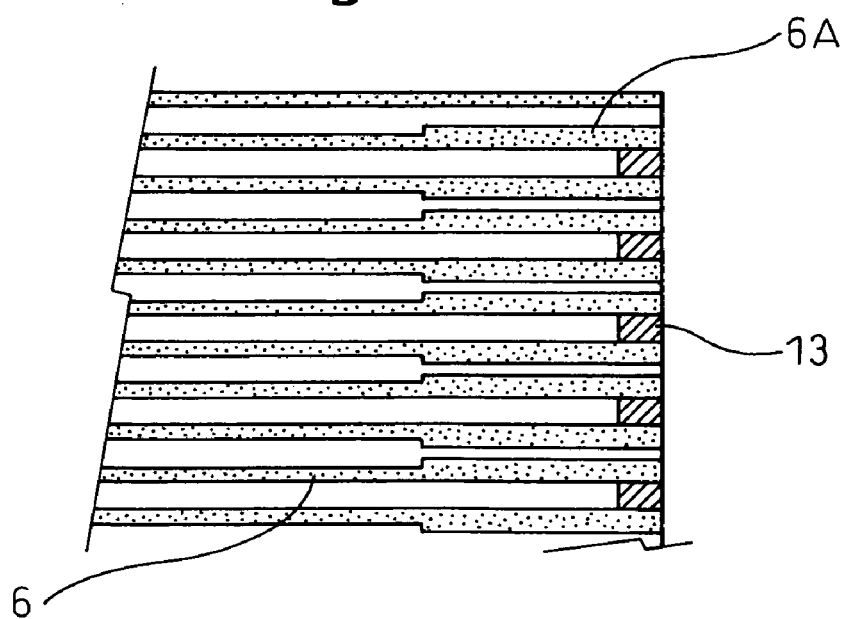
FIG. 7B is an enlarged sectional view of main parts of FIG. 7A.

According to a ninth embodiment shown in FIGS. 7A and 7B, the heat-absorbing area 4 is formed at the exhaust gas flowing-out side end by a catalyst-coated layer 6 carried on the particulate filter 1. In a case of the particulate filter 1 carrying the catalyst-coated layer 6 on a surface thereof, a thickness of the catalyst-coated layer 6 carried on the surface of the cellular wall 11 over a predetermined length from the downstream end thereof is thicker (a part indicated by 6A in the drawing) than the other portions to form the heat-absorbing area 4. As the catalyst-coated layer 6 is formed by the ceramic, such as alumina which carries the catalyst and is a high heat-capacity material, the same effect in which the heat capacity becomes larger to absorb and dissipate the combustion heat if the thickness thereof increase can be obtained. In this regard, an amount of catalyst contained in the catalyst-coated layer 6 which is the heat-absorbing area 4 is preferably the same as in the prior art.

Next, the operation of the exhaust gas cleaner of the above-mentioned structure will be described below. In FIG. 1A, the particulate filter regenerating means calculates an amount of PM deposited in the particulate filter 1 by detecting the pressure difference between front and back ends of the particulate filter 1 by using a pressure-difference sensor not shown. When the calculated amount of deposited PM reaches a predetermined value, the deposited PM is burnt and removed to regenerate the particulate filter 1. The regeneration of the particulate filter 1 is carried out, for example, by controlling the exhaust gas discharged from the internal combustion engine E into the particulate filter 1 to be a high temperature or to be in a state containing a large amount of green (unburnt) fuel so that heat is generated by the catalytic reaction. Thereby, the temperature of the particulate filter 1 sufficiently rises to progress the combustion of PM, whereby PM is burnt and removed.

At this time, when the flow rate of the exhaust gas is rapidly decreased, for example, by the abrupt deceleration of an engine speed, the combustion heat of PM is difficult to be dissipated. According to the present invention, however, the heat-absorbing area 4 provided at the downstream end of the particulate filter 1 absorbs and dissipates the combustion heat of PM. Thereby, the temperature in the most downstream portion of the particulate filter 1 does not rapidly rises as in the prior art, and it is possible to suppress the maximum temperature in the particulate filter 1 below the allowable limit.

Figure 8A:
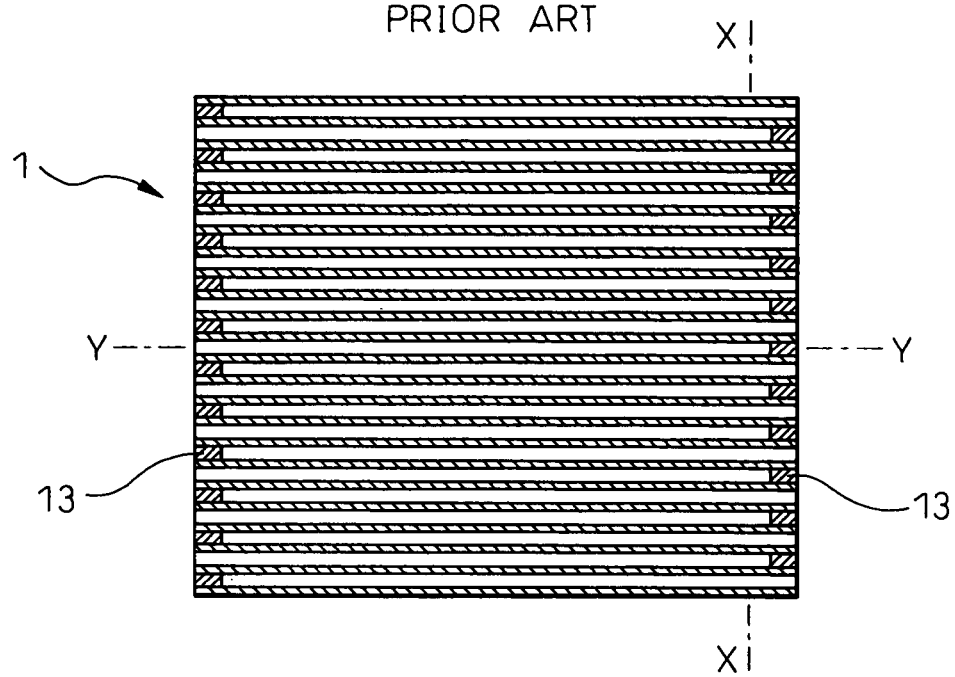
FIG. 8A is a whole sectional view of a conventional particulate filter and is used for explaining an effect of the present invention.
Figure 8B:
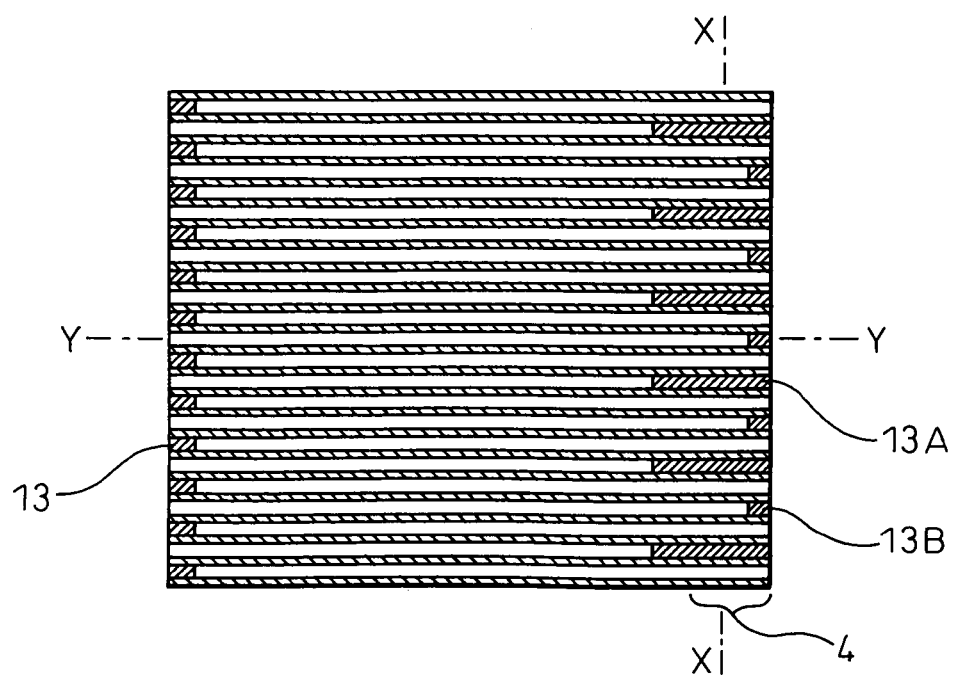
FIG. 8B is a whole sectional view of the particulate filter of the present invention, and is used for explaining an effect of the present invention.

FIGS. 8A, 8B and 8C show results of tests carried out for confirming the effect of the inventive heat-absorbing area 4. The inventive particulate filter 1 shown in FIG. 8B was provided with the heat-absorbing area 4 formed by substantially evenly arranging the deeply clogged sections 13A and the normally clogged sections 13B in a clogged region at the exhaust gas flowing-out side (the structure of the second embodiment shown in FIG. 2B). The matrix of the particulate filter 1 was cordierite, and main specifications of the particulate filter 1 were as follows: a length of the deeply clogged section 13A which is the heat-absorbing area 4 is 30 mm, a length of the normally clogged section 13B is 3 to 4 mm, a radius is 64.5 mm, an axial length is 150 mm, a thickness of the cellular wall is 0.3 mm, and a number of meshes is 300 (a square cell). The particulate filter 1 thus manufactured was attached to the exhaust pipe 2 of the internal combustion engine E and the temperature-rise test was carried out to measure the temperature distribution in the interior of the particulate filter 1. The same test was carried out on the prior art product shown in FIG. 8A and having no heat-absorbing area 4. The prior art product has the same structure as in the inventive product except that the clogged sections 13 have a normal length (3 to 4 mm) both on the exhaust gas flowing-in and flowing-out sides.

As apparent from (B) in FIG. 8C, when the quick combustion of PM occurs in the prior art product having no heat-absorbing area 4, there is a risk in that the temperature of the most downstream part of the particulate filter 1 rapidly rises and the maximum temperature of the interior of the particulate filter 1 exceeds the allowable limit. Accordingly, in the prior art, it is necessary to set an amount of the deposited PM at a lower level (B') at which the regeneration is carried out so that the allowable limit temperature is not exceeded even if the rapid combustion of PM occurs. On the contrary, according to the inventive product having the heat-absorbing area 4, as shown (C) in FIG. 8C, the temperature rise of the particulate filter 1 is suppressed by the heat-absorbing area 4, whereby the maximum temperature in the interior of the particulate filter 1 can be maintained below the allowable limit. Accordingly, it is possible to set the level of the amount of deposited PM, at which regeneration is carried out, higher to prevent the deterioration of the fuel consumption caused by the frequent regeneration of the particulate filter 1.

In this regard, as is apparent from FIG. 8C, the temperature distribution inside the particulate filter 1 is such that the temperature is higher toward the downstream and highest in a central portion, which becomes lower toward the outer circumference. Accordingly, in correspondence to this temperature distribution, the heat-absorbing area 4 is formed so that the heat capacity becomes larger in the central portion or the downstream portion which temperature is liable to be higher. Thus, it is possible to maintain the maximum temperature of the interior of the particulate filter 1 below the allowable limit.

As described above, according to the present invention, it is possible to suppress the temperature rise in the particulate filter and prevent the catalyst from deteriorating and the particulate filter from being damaged even if the rapid chain reaction of PM combustion occurs due to the abrupt deceleration of the engine or others. Accordingly, since it is possible to deposit a larger amount of PM and regenerate the particulate filter at once, the safety and the improvement of the fuel consumption can stand together. Also, since the structure is simple, the manufacture thereof is easy.

In the respective embodiments described above, while the particulate filter is of a wall flow type in which opposite ends of monolithic structures are alternately clogged is used, the present invention should not be limited thereto. For example, a nonwoven fabric filter using ceramic fibers or metallic fibers or a filter of sintered metal may be used. In such a case, it is also possible to obtain the same effect as mentioned before by providing the heat-absorbing area having a larger heat capacity at the exhaust gas flowing-out end of the particulate filter.

While the invention has been described by reference to specific embodiments chosen for the purposes of illustration, it should be apparent that numerous modifications could be made thereto by those skilled in the art without departing from the basic concept and scope of the invention.

The invention claimed is:

1. An exhaust gas cleaner for an internal combustion engine comprising:
   a particulate filter, provided midway in an exhaust pipe of the internal combustion engine, for collecting particles in exhaust gas; and
   a particulate-filter regenerating means for regenerating the particulate filter by burning and removing collected particles at a suitable time;
   wherein a heat-absorbing area having a heat capacity larger than that of the other portions is provided on an end of an exhaust gas flowing-out side of the particulate filter to absorb and dissipate combustion heat generated from particle combustion, wherein the particulate filter is of a wall flow type and has a monolithic structure having a number of cells sectioned by porous walls;

wherein the cells are alternately clogged at an exhaust gas flowing-in side end or the exhaust gas flowing-out side end of the cells, wherein the heat-absorbing area is formed by a deeply clogged structure in which a depth of the clogged sections at the exhaust gas flowing-out side end of the monolithic structure is deeper than that of the clogged sections at the exhaust gas flowing-in side end, wherein on the exhaust gas flowing-out side end, the deeply clogged structure is formed so that deeply clogged sections and normally clogged sections are substantially uniformly arranged.

2. An exhaust gas cleaner for an internal combustion engine as defined in claim 1, wherein a depth of the normally clogged sections on the exhaust gas flowing-out side end is substantially the same as the depth of the clogged sections on the exhaust gas flowing-in side end.

3. An exhaust gas cleaner for an internal combustion engine as defined in claim 1, wherein the deeply clogged sections and the normally clogged sections are alternately arranged.

4. An exhaust gas cleaner for an internal combustion engine as defined in claim 1, wherein a depth of the deeply clogged sections is uniform.

5. An exhaust gas cleaner for an internal combustion engine as defined in claim 1, wherein a depth of the deeply clogged sections is deeper in a central region and becomes gradually shallower towards an outer circumferential region.

6. An exhaust gas cleaner for an internal combustion engine as defined in claim 1, wherein the deeply clogged structure is formed so that deeply clogged sections are provided in a central region and a vicinity thereof except for the outer circumference.

7. An exhaust gas cleaner for an internal combustion engine comprising:

a particulate filter, provided midway in an exhaust pipe of the internal combustion engine, for collecting particles in exhaust gas; and a particulate-filter regenerating means for regenerating the particulate filter by burning and removing collected particles at a suitable time;

wherein a heat-absorbing area having a heat capacity larger than that of the other portions is provided on an end of an exhaust gas flowing-out side of the particulate filter to absorb and dissipate combustion heat generated from particle combustion;

wherein the particulate filter is of a wall flow type and has a monolithic structure having a number of cells sectioned by porous walls;

wherein the cells are alternately clogged at an exhaust gas flowing-in side end or the exhaust gas flowing-out side end of the cells, wherein the heat-absorbing area is formed by coating a ceramic heat-capacitated material which is different from a matrix of the filter on the cellular wall surfaces at the exhaust gas flowing-out side end of the monolithic structure and the heat-capacitated material has a heat capacity larger than that of the monolithic structure.

* * * * *